United States Patent
Slater et al.

(10) Patent No.: US 10,135,117 B2
(45) Date of Patent: Nov. 20, 2018

(54) WIRELESS COMMUNICATION SYSTEM WITH MULTI-MODE CAVITY ANTENNAS

(71) Applicant: Motorola Mobility LLC, Chicago, IL (US)

(72) Inventors: Matthew J Slater, Elmhurst, IL (US); Mohammed Abdul-Gaffoor, Palatine, IL (US); Eric L Krenz, Crystal Lake, IL (US); Juan M Martinez, Barrington, IL (US); Hugh K Smith, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 223 days.

(21) Appl. No.: 15/084,535

(22) Filed: Mar. 30, 2016

(65) Prior Publication Data

US 2017/0288300 A1    Oct. 5, 2017

(51) Int. Cl.
| | |
|---|---|
| *H01Q 1/24* | (2006.01) |
| *H04M 1/02* | (2006.01) |
| *H04B 1/3888* | (2015.01) |
| *H01Q 9/04* | (2006.01) |
| *H01Q 21/28* | (2006.01) |

(52) U.S. Cl.
CPC ........... *H01Q 1/243* (2013.01); *H01Q 9/0407* (2013.01); *H01Q 9/0421* (2013.01); *H01Q 21/28* (2013.01); *H04B 1/3888* (2013.01); *H04M 1/026* (2013.01)

(58) Field of Classification Search
CPC .............................. H01Q 1/243; H01Q 13/18
See application file for complete search history.

(56) References Cited

U.S. PATENT DOCUMENTS

2016/0104944 A1* 4/2016 Rajagopalan ............ H01Q 9/42
343/725

OTHER PUBLICATIONS

Antennas, "Cavity-Backed Slot Antennas", http://www.antenna-theory.com/antennas/aperture/slot2.php, 2009-2011, 4 pages.
Wonbin Hong, et al., "Size Reduction of Cavity-Backed Slot Antennas", IEEE Transactions on Antennas and Propagation, vol. 54, No. 5, May 2006, pp. 1461-1466.

* cited by examiner

*Primary Examiner* — Graham Smith
(74) *Attorney, Agent, or Firm* — Cygan Law Offices P.C.; Joseph T. Cygan

(57) ABSTRACT

An antenna system for implementation in a wireless communication system such as a mobile device, and a wireless communication system employing such an antenna system, and a related methodology, are disclosed herein. In one example embodiment, a mobile device includes a display, a chassis, and one or more electrical components. The display is provided along a front surface of the mobile device, and the chassis has first and second cavities provided along a rear surface of the mobile device, the rear surface being substantially opposite the front surface. Further, the one or more electrical components is or are supported in between the display and the chassis, and the one or more electrical components provide excitation signals to one or both of the first and second cavities so as to cause electrical fields in accordance with a plurality of modes to occur respectively within the cavities at multiple frequencies, respectively.

17 Claims, 11 Drawing Sheets

TM11

COUPLED

TM01

WIRELESS COMMUNICATION SYSTEM WITH MULTI-MODE CAVITY ANTENNAS

FIELD OF THE DISCLOSURE

The present disclosure relates to wireless communication systems including but not limited to mobile devices, and particularly to antenna systems implemented in such wireless communication systems.

BACKGROUND OF THE DISCLOSURE

Mobile devices such as smart phones communicate with external devices via antenna systems implemented on those devices. In some conventional mobile device arrangements, the mobile device has a forehead region and a chin region at opposite (e.g., top and/or bottom) ends of the mobile device that serve to provide antenna volume. The antennas used in such conventional antenna schemes are typically derivative of monopole or loop antennas, and operate through excitation of the larger mobile device/phone chassis as an antenna.

Even in mobile devices that are constructed primarily of metal, some portion or area of the mobile device typically will be non-metallic, particularly in order to reserve some non-metallic physical volume for the antenna(s) of the mobile device. Although the reserving of such a portion or area in this manner can be appropriate for situating antennas on the mobile device in a desired manner, this also tends to limit or constrain both the size of the mobile device and the amount of the surface of the mobile device that can be constructed from metal.

Therefore, it would be beneficial if an improved antenna system or systems could be developed for implementation in relation to mobile devices or other systems, as well as beneficial if improved mobile devices or other systems having such an improved antenna system(s) could be developed, so as to overcome one or more of the above-discussed limitations or other limitations, and/or to achieve one or more other benefits.

SUMMARY

The present disclosure in at least one example embodiment relates to a mobile device that includes a display, a chassis, and one or more electrical components. The display is provided along a front surface of the mobile device, and the chassis has first and second cavities provided along a rear surface of the mobile device, the rear surface being substantially opposite the front surface. Additionally, the one or more electrical components is or are supported in between the display and the chassis, and the one or more electrical components provide excitation signals to one or both of the first and second cavities so as to cause electrical fields in accordance with a plurality of modes to occur respectively within the cavities at multiple frequencies, respectively.

Additionally, the present disclosure in at least another example embodiment relates to an antenna system that includes a first cavity, a second cavity, a first feed structure, and a controller. The first cavity includes first, second, and third metallic wall portions, where the first and second metallic wall portions are substantially parallel with one another and separated by a first dielectric portion, and where first and second edges of the first and second metallic wall portions are coupled together by way of the third metallic wall portion. The second cavity includes fourth, fifth, and sixth metallic wall portions, where the fourth and fifth metallic wall portions are substantially parallel with one another and separated by a second dielectric portion, and where third and fourth edges of the fourth and fifth metallic wall portions are coupled together by way of the sixth metallic wall portion. Further, the second metallic wall portion is integrally formed or coupled with the fifth metallic wall portion and the second and fifth metallic wall portions form a ground plane, and the first and fourth metallic wall portions are spaced apart from one another by way of a slit region. Also, the first feed structure is positioned within the first cavity, and the controller applies one or more excitation signals to the first feed structure. Further, in response to the one or more excitation signals a first mode at a first frequency is generated within the first cavity and a second mode is generated either within the first cavity or the second cavity either at the first frequency or at a second frequency and, in response to the generation of the first and second modes, electromagnetic radiation is emitted from one or both of the first and second cavities.

Further, the present disclosure in another example embodiment relates to a method that includes providing an antenna system including first and second cavities and first and second feed points in the first and second cavities. Additionally, the method also includes exciting by way of the first feed point at the first cavity either (a) both a directly-fed mode in the first cavity at a first frequency and a coupled-fed mode in the second cavity, or (b) one or more hybrid modes with one or more field patterns spanning both the first and second cavities. Also, the method further includes transmitting electromagnetic energy away from the antenna system due to the exciting.

DETAILED DESCRIPTION

The present inventors have recognized that mobile devices can achieve improved performance through the use of improved antenna systems that in at least some embodiments have antenna(s) including cavities on the back of the phone, in which multiple modes can be excited as appropriate to cover the various frequency bands of interest. At least some such improved antenna systems as described herein reflect a substantial paradigm shift relative to the antenna systems of many conventional cellular telephones that are designed in accordance with a monopole-exciting-phone-chassis-as-antenna paradigm.

Additionally, at least some such improved antenna systems as described herein can allow for the realization of significant industrial design features on the mobile devices on which the antenna systems are implemented, including for example the realization of mobile devices that are completely or substantially formed from metal, and the realization of mobile devices that need not have (or need not have substantially) the types of chin or forehead extensions that are found in many conventional cellular telephones. In addition to providing a method of implementing a metal mobile device or phone, implementing such improved antenna systems in at least some embodiments described herein also can allow for the length of the mobile device or phone to be significantly reduced by comparison with many conventional phones, by moving a desired keepout of the main transmit antenna to the back of the device. Additionally, the back-integrated transmit antenna provided by at least some such antenna systems as described herein also serves to direct the transmit antenna's radiation away from the head of a user of the mobile device so as to improve head or body-related antenna performance.

Figure 1:
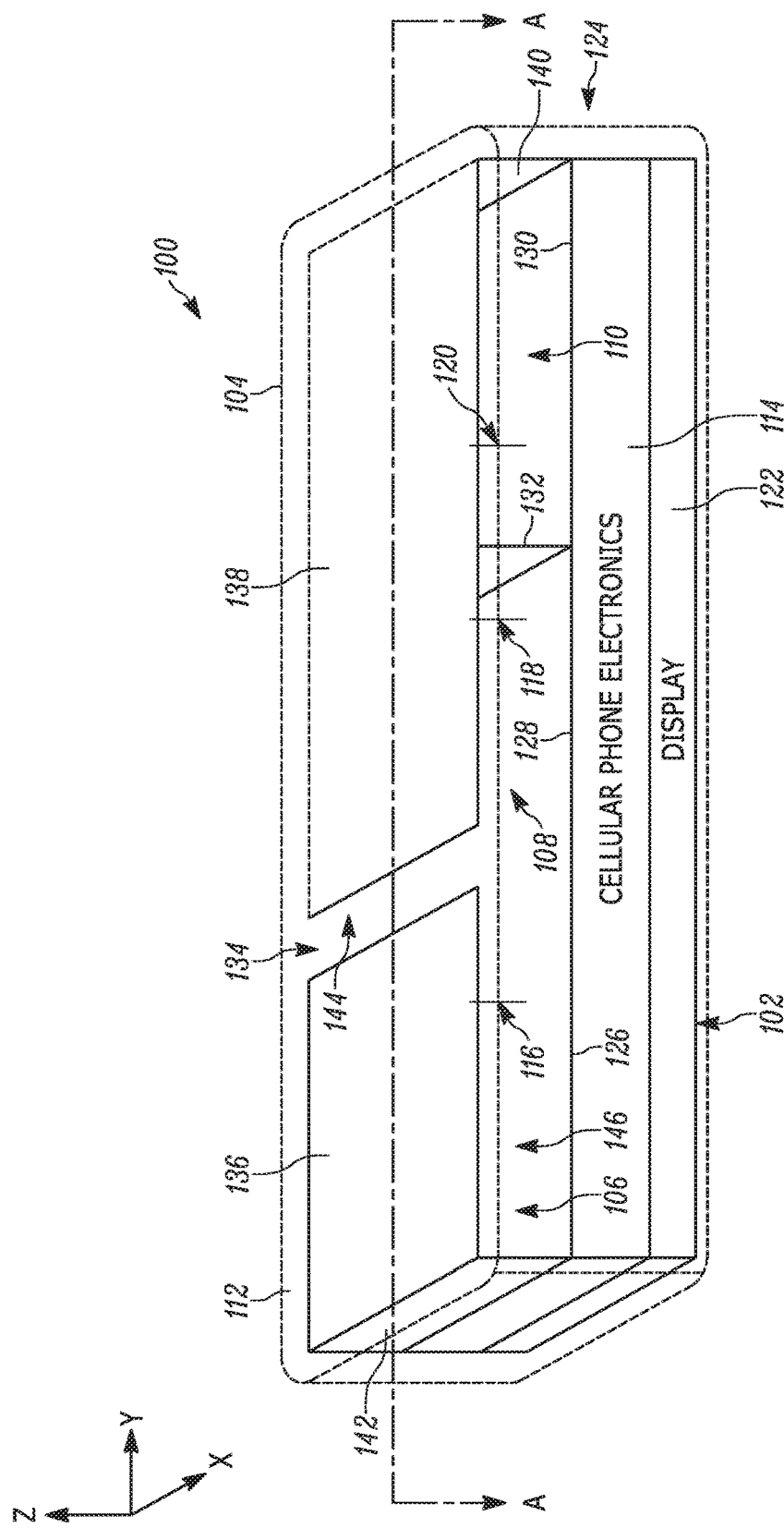
FIG. 1 is a perspective view of an example mobile device shown in schematic form (with an exterior housing of the mobile device shown in phantom) including cavities of an antenna system of the mobile device.

Referring to FIG. 1, a perspective view of an example mobile device 100 is shown in schematic form. In the present example, the mobile device 100 can be considered to be a cellular telephone such as a smart phone although, in other embodiments, the mobile device can take other forms. As shown in FIG. 1, the mobile device 100 includes internal components 102 surrounded by an external housing 104. The external housing 104 is shown in phantom to allow for a clearer view of the internal components 102, which are illustrated schematically as being strictly rectangular prisms or boxes although this need not be the case in practice. In the present embodiment, the internal components 102 of the mobile device 100 include first, second, and third resonant cavities 106, 108, and 110 formed at least in part from metal along a back surface 112 of the mobile device, which is a metal-backed mobile device (or metal-backed phone). The back surface 112, and portions of the resonant cavities 106, 108, and 110 formed thereby, can also serve as the chassis of the mobile device (or a portion of the chassis of the cell phone).

In addition to the cavities 106, 108, and 110, the internal components 102 additionally include cellular phone electronics 114, first, second, and third feed points 116, 118, and 120, respectively, and a display 122. As will be described in further detail below, the first, second, and third cavities 106, 108, and 110 can be excited by way of signals applied to one or more of the first, second, and third feed points 116, 118, and 120 by way of the cellular phone electronics 114. If excited in this manner, the first, second, and third cavities 106, 108, and 110 can serve as cavity antennas of an antenna system 124 of the mobile device 100, which can generally be understood as encompassing portions of the cellular phone electronics 114, the cavities 106, 108, and 110, and the feed points 116, 118, and 120. The feed points 116, 118, and 120 in the present embodiment are "probe feeds," which can for example be formed by way of segments of coaxial cable that extend inward into (but not all of the way across) the respective cavities from locations along the back surface 112. In alternate embodiments, one or more feed points can take another form, such as "aperture feeds."

Also as will be described additionally below, the antenna system 124 can be operated in a variety of manners, including manners in which multiple modes are excited in the various cavities 106, 108, and 110. The feed points 116, 118, and 120 are particularly positioned at locations within the first, second, and third cavities 106, 108, and 110 at or near where it is envisioned that field levels will be strongest (or strong) or field maxima will occur during excitation of modes of interest. In at least some embodiments described herein, it is particularly desired that multiple field patterns or modes be excited in a given one of the cavities 106, 108, and 110. In at least some such embodiments, the feed point for such a cavity can be positioned at a location that is at or near a position at which field maxima will occur whenever any of the desired modes are excited in that cavity.

In addition to the above-described features, FIG. 1 shows the mobile device 100 as additionally including first, second, and third bottom surfaces 126, 128, and 130, respectively, of the first, second, and third cavities 106, 108, and 110, respectively. These surfaces 126, 128, and 130 can collectively be implemented as a ground plane above the (internal) cellular phone electronics 114, or by reuse of the internal grounding of the mobile device 100. In at least some embodiments, this ground plane can be formed by way of a printed circuit board (PCB). Also, it should be appreciated that the arrangements of the cavities 106, 108, and 110 is not entirely symmetrical. Rather, as shown, a wall formation 132 that can be a metallic formation extends between and divides the second and third cavities 108 and 110. By contrast, there is no such wall formation between the first and second cavities 106 and 108. However, a slit 134 is formed along the back surface 112 of the mobile device 100 that constitutes a separation or space between a first portion 136 of the back surface 112 that forms part of the first cavity 106 and a second portion 138 of the back surface 112 that forms part of the second cavity 108 and also continues on to form part of the third cavity 110.

Finally, it should be also be appreciated that the first and second portion 136 and 138 of the back surface 112 are coupled to the first, second, and third bottom surfaces 126, 128, and 130 in specific manners. The wall formation 132 particularly connects the second and third bottom surfaces 128 and 130 with the second portion 138 of the back surface 112. Additionally, the third bottom surface 130 is coupled to the second portion 138 of the back surface 112 by way of a first end wall 140 and the first bottom surface 126 is coupled to the first portion 136 of the back surface by way of a second end wall 142. Each of the first and second portions 136, 138, the wall formation 132, the first and second end walls 140, 142, and the first, second, and third bottom surfaces 126, 128, and 130 are metallic. Thus, the first portion 136 is coupled to the ground plane provided by the first bottom surface 126 by way of the second end wall 142, and the second portion 138 is coupled to the ground plane provided by the second and third bottom surfaces 128 and 130 by way of the wall formation 132 and the first end wall 140.

At the same time, notwithstanding the presence of the wall formation 132, first end wall 140, and second end wall 142, in the present embodiment there are not any additional walls or wall formations formed alongside edges 144 and 146 of the first, second, and third cavities 106, 108, and 110 between the first and second end walls 140 and 142. Rather, the side edges 144, 146 can be considered open or partially-open channels that link the cavities 106, 108, and 110. Thus, in the present example embodiment, the first portion 136 of the back surface 112 is coupled to the ground plane of the first, second, and third bottom surfaces 126, 128, and 130 only by way of the second end wall 142, and the first cavity 106 is only surrounded by metal along three sides formed by the first portion 136, first bottom surface 126, and second end wall 142. Relatedly, the second portion 138 of the back surface 112 is coupled to the ground plane of the first, second, and third bottom surfaces 126, 128, and 130 only by way of the first end wall 140 and the wall formation 132. Therefore, the second cavity 108 is only surrounded by metal along three sides formed by the second portion 138, the wall formation 132, and the second bottom surface 128, and the third cavity 110 is only surrounded by metal along four sides formed by the second portion 138, the wall formation 132, the first end wall 140, and the third bottom surface 130.

As already mentioned, the cavities 106, 108, and/or 110 can be excited by the applications of signals to the feed points 116, 118, and/or 120. In general, it should be appreciated that a cavity with one shorted end (such as the first and second cavities 106 and 108) can be operated in several modes as an antenna. The frequency of operation of each mode is determined by the length, width, and dielectric constant, $\varepsilon_r$, of the fill material of the cavity. More particularly, the frequencies of operation of the supported modes of a cavity can be calculated analytically and give good correlation to simulation. It will be appreciated that, for a single-short rectangular cavity (which could be any of the cavities 106 or 108) having dimensional extents of a, b, and c along x, y, and z axes (e.g., as illustrated in FIG. 1) and filled with a fill material having a dielectric constant $\varepsilon_r$, the z-component of the electric field $E_z$ is given by:

$$E_z = \cos(k_x)\sin(k_y) \quad (1)$$

where the wave numbers $k_x$ and $k_y$ are given by $$k_x = (m\pi)/a \quad (2)$$

$$k_y = (n\pi)/(2b) \quad (3)$$

where m, n=0, 1, 2 . . . . Further, given c to be the speed of light, the frequency of operation of each mode (m,n) is given by:

$$f = (c/2)((m^2/a^2) + (n^2/(4b^2)))^{1/2} \quad (4)$$

It should be appreciated that, although these equations are particularly suited for performing calculations in relation to rectangular cavities as are described herein, the present disclosure also is intended to encompass other embodiments with cavities of other shapes, and corresponding calculations (either canonical or numerical or both) can be made for implementing such cavities.

It should further be appreciated that a cavity need not be limited to one that is open on three sides and shorted on the fourth (which would be similar to classic quarter-wave microstrip patch antenna configurations). Rather, more than one edge of the cavity can be shorted, either for antenna design purposes or because of a mechanical constraint on the design of the device. For example, even for a cavity in which two opposite edges are shorted (e.g., the third cavity 110), the cavity can still support higher-frequency modes that radiate efficiently via the two open edges. Although this configuration is not conventionally preferred or investigated for conventional microstrip antennas, it in fact permits utilizing available space, in spite of mechanical constraints, to cover additional bands of operation. This type of resonant cavity particularly can be integrated into the chassis of a cellular phone, either as an endo- or exo-shell. The dimensions of the cavity and fill material can be selected such that some or all of the low-order resonant modes radiate efficiently at targeted cellular bands.

In the mobile device 100 of FIG. 1, the first, second, and third cavities 106, 108, and 110 constitute multiple (three) independent cavities of these types that are integrated into the phone chassis to provide radiation bandwidth to cover all (or substantially all) cellular bands. As mentioned above, each of the cavities 106, 108, and 110 can be particularly excited by way of respective signals applied to corresponding ones of the feed points 116, 118, and 120, respectively. However, because of the absence of metal walls along the side edges 144 and 146, as discussed above, in at least some implementations or circumstances energy (radiation) can also be coupled between the various ones of the cavities 106, 108, and 110, and particularly between adjacent ones of the cavities (e.g., between the cavities 106 and 108, or between the cavities 108 and 110). Indeed, because the cavities 106, 108, and 110 are adjacent to one another, adjacent ones of the cavities (e.g., the cavities 106 and 108, or the cavities 108 and 110) can also be coupled to one another, and additional modes are possible to cover additional bands. Thus, as described additionally herein, excitation of modes within a given one of the cavities 106, 108, and 110 can result, through coupling between the cavities, in the excitation of modes in other ones of those cavities. Relatedly, it should be understood that the resonant modes of the three cavities 106, 108, and 110, as well as some hybrid modes created by coupling of the cavities, are tuned according to the geometry of the mobile device to the frequencies of the desired cellular bands of operation of the device.

Further, as will also be described below, because the cavities 106, 108, and 110 of the antenna system 124 are arranged along, and form parts of, the back surface 112 of the mobile device 100, correspondingly the antenna system has the advantage of being on the back of the phone in the present embodiment. Such an arrangement of the antenna system 124 along the back of the phone eliminates the larger of the conventionally-desired antenna keepouts, dramatically increasing the active area on the front of the phone and enabling a three-side borderless display. It also serves to direct a larger portion of radiation away from a mobile device user's head than many typical cell phone antennas, so as to reduce head or body-related antenna performance degradation. Additionally, in the present embodiment, the coupling between the cavities 106, 108, and 110 is enhanced and controlled via inter-cavity channels formed along the edges of the device. The channels are formed simply by not extending the shorting walls all the way to the outer edges of the device.

Figure 2:
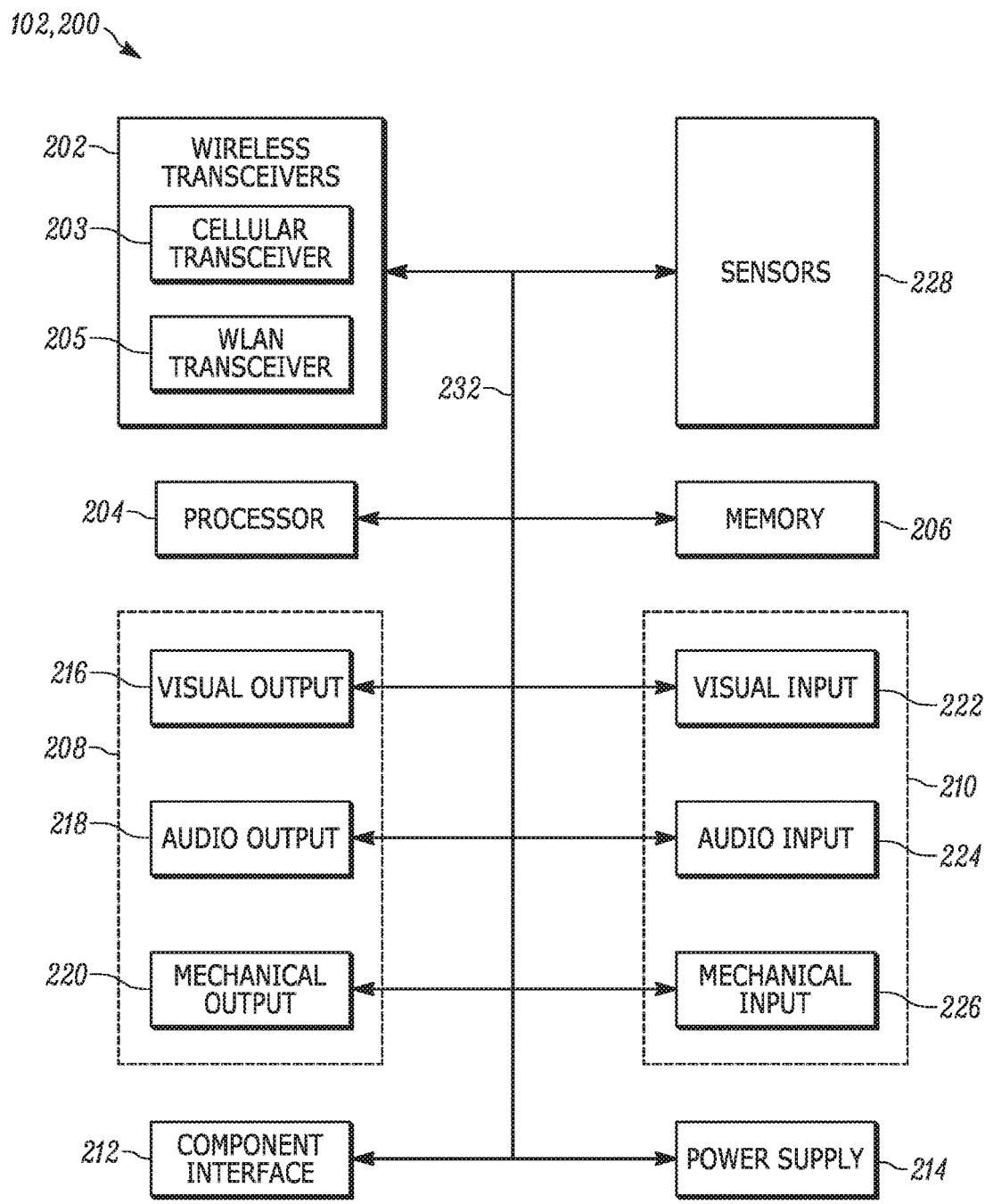
FIG. 2 is a block diagram showing in additional detail several example components of the example mobile device of FIG. 1.

It should be appreciated that the internal components 102 of the mobile device 100, and particularly the cellular phone electronics 114 thereof, can include a variety of additional components or subcomponents other than those specifically shown in FIG. 1. For purposes of illustrating in more detail some such example components or subcomponents that can be provided in the mobile device 100, FIG. 2 is provided. More particularly, FIG. 2 is a block diagram 200 illustrating the internal components 102 of the mobile device 100. As shown, the internal components 102 of the mobile device 100 include one or more wireless transceivers 202, a processor 204 (e.g., a microprocessor, microcomputer, application-specific integrated circuit, etc.), a memory portion 206, one or more output devices 208, and one or more input devices 210. The internal components 102 can further include a component interface 212 to provide a direct connection to auxiliary components or accessories for additional or enhanced functionality.

Further as shown, the internal components 102 also include a power supply 214, such as a battery, for providing power to the other internal components while enabling the mobile device 100 to be portable. Also, the internal components 102 additionally include one or more sensors 228. All of the internal components 102 can be coupled to one another, and in communication with one another, by way of one or more internal communication links 232 (e.g., an internal bus). In terms of the correspondence between the internal components 102 as shown in FIG. 1 and as shown in FIG. 2, it should be appreciated that the wireless transceivers 202 can be understood as comprising the antenna system 124 with the cavities 106, 108, and 110 and feed points 116, 118, and 120, as well as portions of the cellular phone electronics 114, of FIG. 1. As will be described further below, the display 122 can be considered as being among the output devices 208 and input devices 210. Otherwise, the internal components 102 shown in FIG. 2 can be considered as corresponding to the cellular phone electronics 114 of FIG. 1.

Further with respect to the wireless transceivers 202, the exact features and subcomponents of the wireless transceivers 202 can vary depending upon the embodiment. For example, in the present embodiment of FIG. 2, the wireless transceivers 202 particularly include a cellular transceiver 203 and a wireless local area network (WLAN) transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

The WLAN transceiver 205 may, but need not, be configured to conduct Wi-Fi communications in accordance with the IEEE 802.11 (a, b, g, or n) standard with access points. In other embodiments, the WLAN transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the WLAN transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the wireless transceivers 202 include the wireless transceivers 203 and 205, the present disclosure is intended to encompass numerous embodiments in which any arbitrary number of (e.g., two, or less than or more than two) wireless transceivers employing any arbitrary number of (e.g., less than two, or two or more) communication technologies are present.

Exemplary operation of the wireless transceivers 202 in conjunction with others of the internal components 102 of the mobile device 100 can take a variety of forms and can include, for example, operation in which, upon reception of wireless signals, the components detect communication signals and the transceivers 202 (FIG. 2) demodulate the communication signals to recover incoming information, such as voice and/or data, transmitted by the wireless signals. After receiving the incoming information from the wireless transceivers 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceiver(s) 202 convey the modulated signals by way of wireless and (possibly wired as well) communication links for receipt by other devices such as a cell tower, access point, or other recipient device.

Depending upon the embodiment, the internal components 102 can include any of a variety of numbers and types of devices that serve as the one or more input devices 210, or the one or more output devices 208, or any of various combinations of the input devices 210 and output devices 208. The input and output devices 208, 210 can include or provide a variety of visual, audio and/or mechanical inputs and outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 can include, among other things, the display 122 of FIG. 1, which can be further for example a touch screen display.

The input devices 210 can include, for example, one or more visual input devices 222, which can include a camera system. Also, the input devices can further include one or more audio input devices 224 such as a microphone, or one or more mechanical input devices 226 such as a flip sensor, keyboard, keypad, selection button, navigation cluster, touch pad, touchscreen, capacitive sensor, motion sensor, and switch. To the extent that the display 122 of FIG. 1 is a touch screen display as mentioned above, that display can also be viewed as constituting one of the mechanical input devices 226 as well as one of the visual output devices 216. Actions that can actuate one or more of the input devices 210 can include not only the physical pressing/actuation of buttons or other actuators, but can also include, for example, opening the mobile device 100 (if the device can take on open or closed positions), unlocking the device, moving the device to actuate a motion, moving the device to actuate a location positioning system, and operating the device.

The internal components 102 of the mobile device 100 can also include one or more of various types of sensors 228. The sensors 228 can include, for example, proximity sensors (a light detecting sensor, an ultrasound transceiver or an infrared transceiver), touch sensors, altitude sensors, a location circuit that can include, for example, a Global Positioning System (GPS) receiver, a triangulation receiver, an accelerometer, a tilt sensor, a gyroscope, or any other information collecting device that can identify a current location or user-device interface (carry mode) of the mobile device 100. Although the sensors 228 are for the purposes of FIG. 2 considered to be distinct from the input devices 210, in other embodiments it is possible that one or more of the input devices can also be considered to constitute one or more of the sensors (and vice-versa). Additionally, as already noted above, even though in the present embodiment the input devices 210 are shown to be distinct from the output devices 208, it should be recognized that in some embodiments one or more devices (again, for example, the display 122) can serve both as input and output devices.

The memory 206 included among the internal components 102 of the mobile device 100 can encompass one or more memory devices of any of a variety of forms (e.g., read-only memory, random access memory, static random access memory, dynamic random access memory, etc.), and can be used by the processor 204 to store and retrieve data. In some embodiments, the memory 206 can be integrated with the processor 204 in a single device (e.g., a processing device including memory or processor-in-memory (PIM)), albeit such a single device will still typically have distinct portions/sections that perform the different processing and memory functions and that can be considered separate devices.

The data that is stored by the memory 206 can include, but need not be limited to, operating systems, applications, and informational data, as can be stored in a database. Each operating system includes executable code that controls basic functions of the mobile device 100, such as interaction among the internal components 102 included in the mobile device, communication with external devices via the wireless transceivers 202 and/or the component interface 212, and storage and retrieval of applications and data, to and from the memory 206. In addition, the memory 206 can include one or more applications for execution by the processor 204. Each application can include executable code that utilizes an operating system to provide more specific functionality for the mobile device, such as file system service and the handling of protected and unprotected data stored in the memory 206. Informational data is non-executable code or information that can be referenced and/or manipulated by an operating system or application for performing functions of the mobile device. Such informational data can include, among other things, portions of data that are or can be encompassed or transmitted as part of messages, such as textual data, image (e.g., picture file) data, video data, and other types of data.

Turning now to FIGS. 3A, 3B, 3C, 3D, 4A, 4B, and 4C, the mobile device 100 and antenna system 124 thereof can be operated in a variety of manners to achieve a variety of field characteristics and modes of operation. FIGS. 3A-3D respectively show first, second, third and fourth contour diagrams 300, 330, 350, and 370, respectively, that illustrate four example field patterns as can exist within the cavities 106, 108, and 110 of the antenna system 124 of the mobile device 100 of FIG. 1 at locations within a plane corresponding to line A-A of FIG. 1 (the plane being parallel to the back surface 112 and display 122). The field patterns of the contour diagrams 300, 330, 350, and 370 of FIGS. 3A-3D are, respectively, four different low band field patterns (or, in the case of FIG. 3D, a combination or hybrid low band and high band field pattern) that can arise in response to the antenna system 124 of the mobile device of FIG. 1 being excited in four different manners, respectively.

Figure 3A:
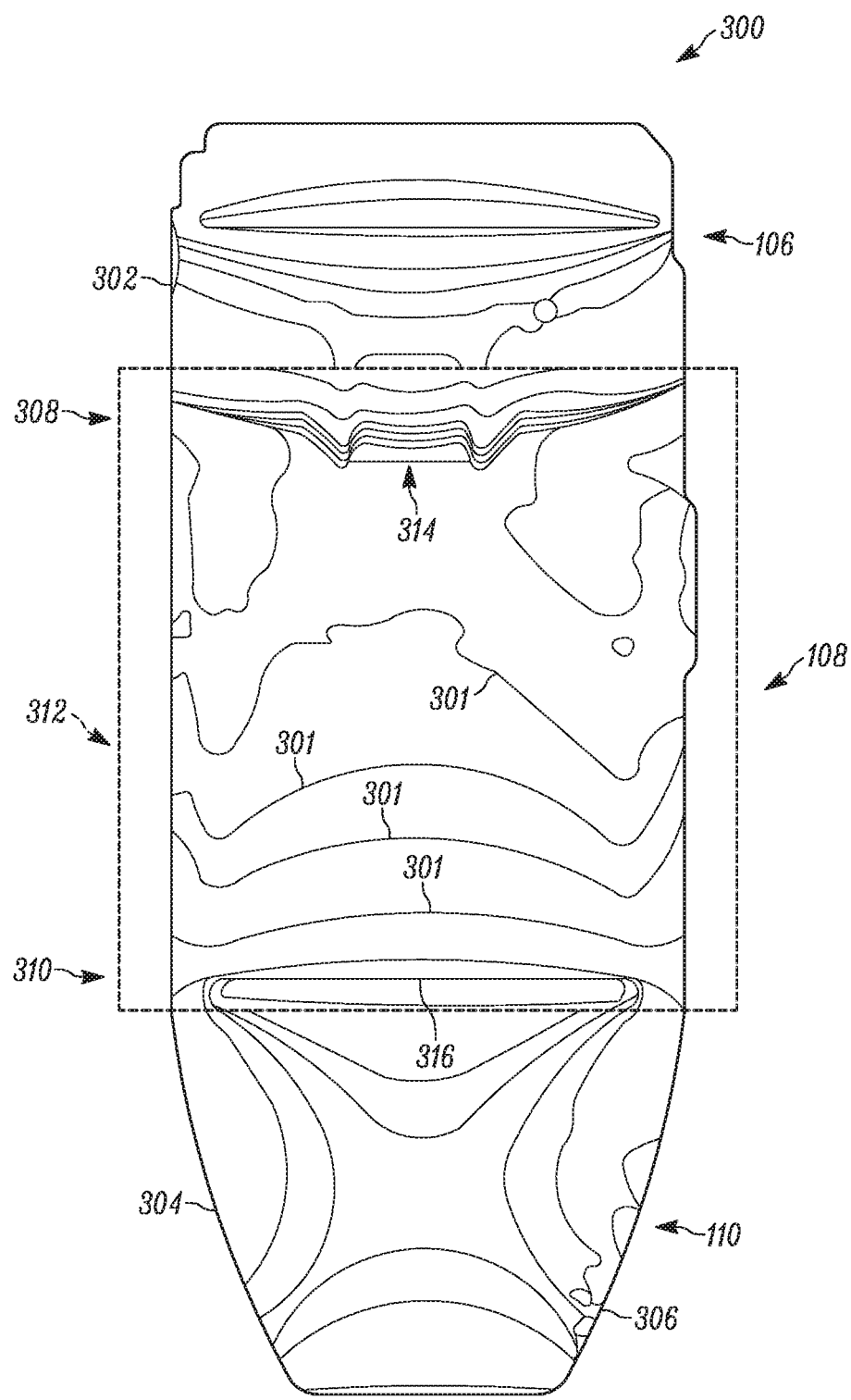
FIGS. 3A-3D and 4A-4C are seven contour diagrams showing seven example field patterns that can arise in response to the antenna system the mobile device of FIG. 1 being excited in seven different manners, as can exist within cavities of the antenna system of the mobile device of FIG. 1 at locations along a plane corresponding to line A-A of FIG. 1.
Figure 3B:
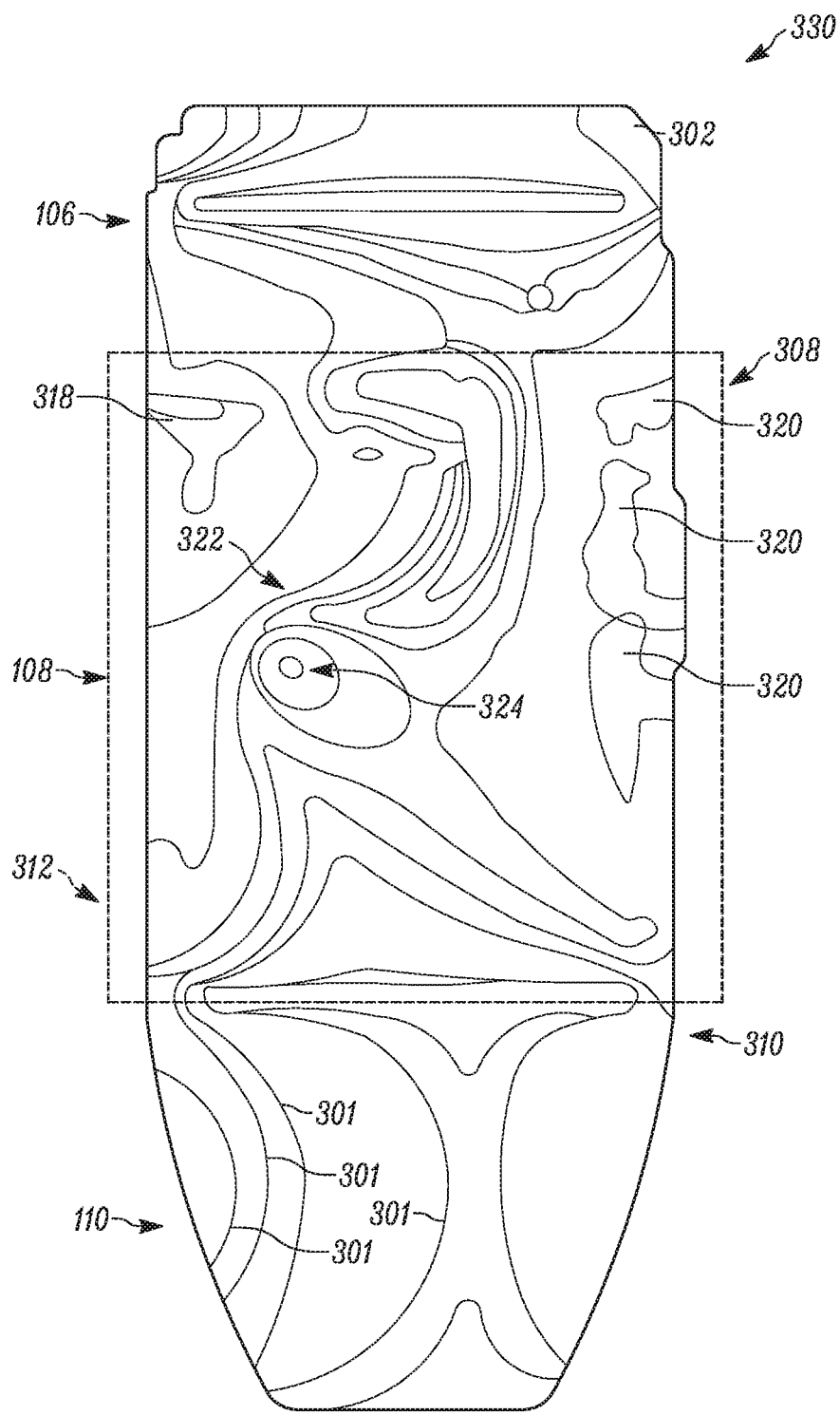
Figure 3C:
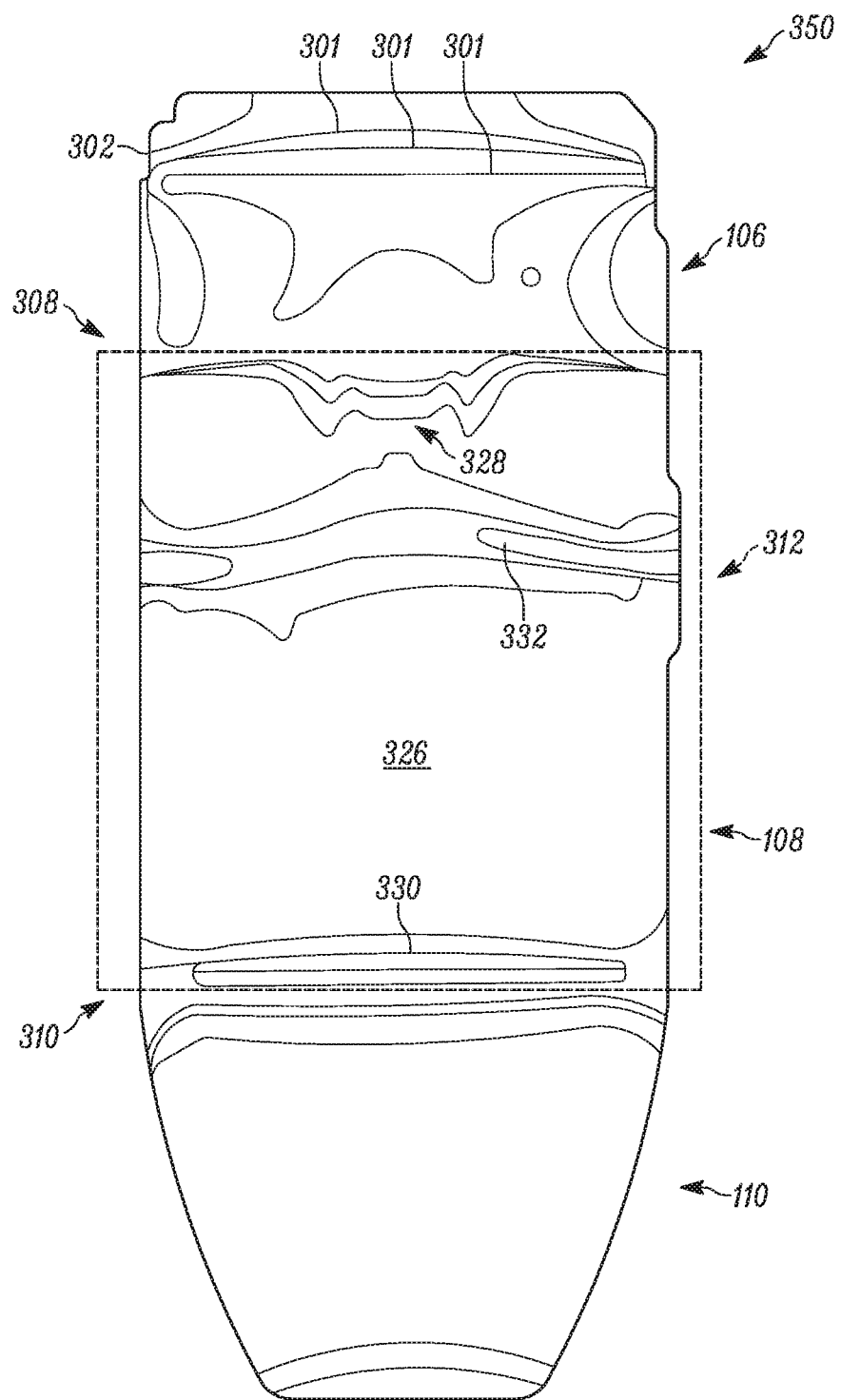
Figure 3D:
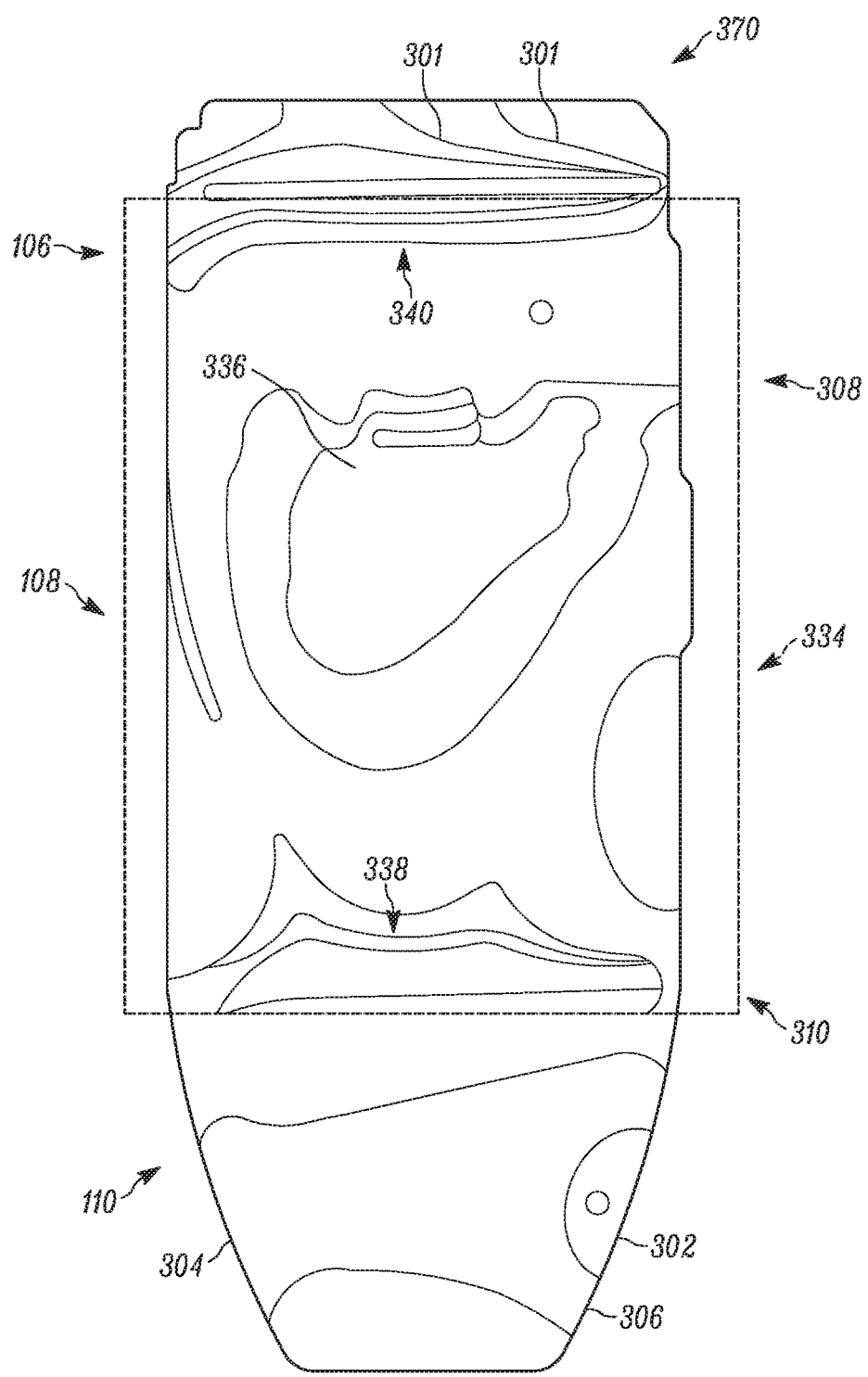
Figure 4A:
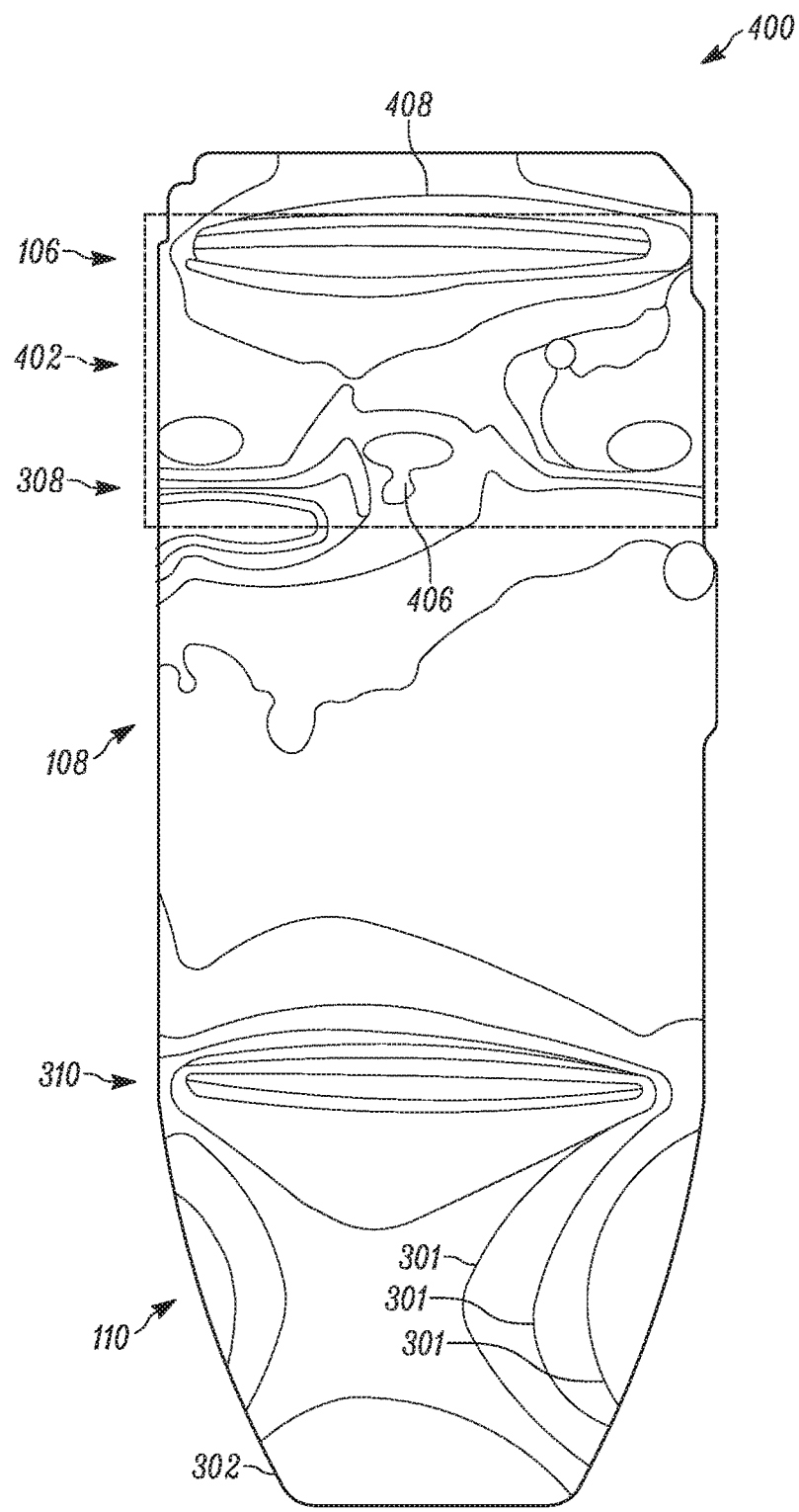
Figure 4B:
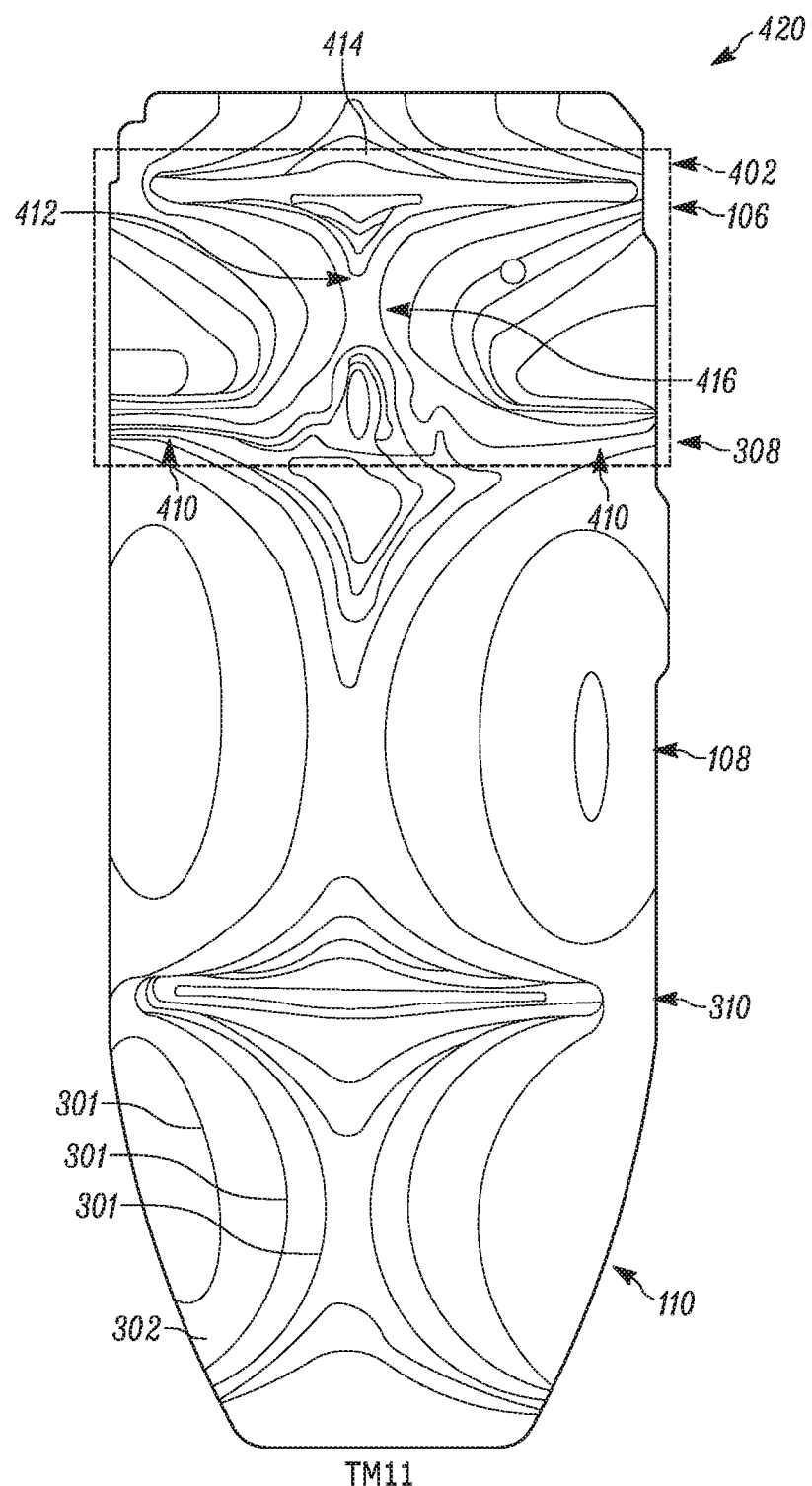
Figure 4C:
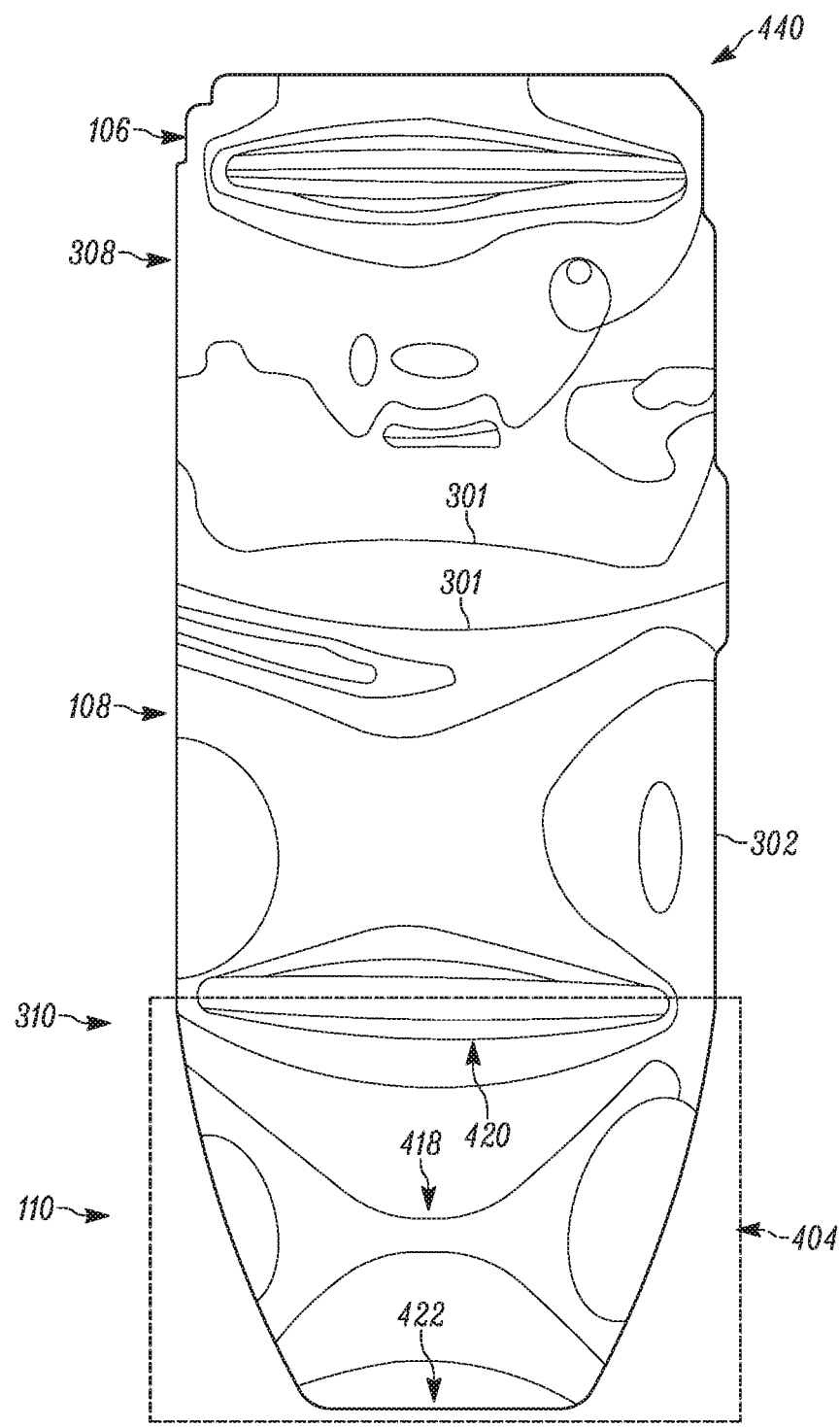

FIGS. 4A-4C respectively show fifth, sixth, and seventh contour diagrams 400, 420, and 440, respectively, that illustrate three additional example field patterns as can exist within the cavities 106, 108, and 110 of the antenna system 124 of the mobile device 100 of FIG. 1 at locations within a plane corresponding to line A-A of FIG. 1. In contrast to the field patterns of FIGS. 3A-3D, the field patterns of the contour diagrams 400 and 420 of FIGS. 4A and 4B are, respectively, two different high band field patterns that can arise in response to the antenna system 124 being excited in two additional different manners, respectively. Also, the field pattern of the contour diagram 440 of FIG. 4C is a passive field pattern that can arise in response to the antenna system 124 being excited in a further different manner.

In each of the contour diagrams 300, 330, 350, 370, 400, 420, and 440 of FIGS. 3A-3D and 4A-4C, it should be understood that the fields being represented particularly are vertical electrical field amplitudes, where "vertical" should be understood to be a direction perpendicular to the display 122 of the mobile device 100. Contour lines 301 shown within each of the contour diagrams of FIGS. 3A-3D and 4A-4C particularly demarcate regions of substantially different levels of vertical electrical field amplitude, some of which are described in more detail below. Because the contour diagrams 300, 330, 350, 370, 400, 420, and 440 show field levels as can exist within the cavities 106, 108, and 110 at locations corresponding to line A-A of FIG. 1, the portions of those contour diagrams falling within the boundaries of those cavities are respectively marked with the reference numerals 106, 108, and 110.

Although it will be observed that each of the contour diagrams 300, 330, 350, 370, 400, 420, and 440 of FIGS. 3A-3D and 4A-4C shares an exterior perimeter 302 that has curved portions such as curved portions 304 and 306 even though the cavities 106, 108, and 110 of FIG. 1 are shown to be rectangular prisms, this should not be viewed as an inconsistency between FIG. 1 and FIGS. 3A-3D and 4A-4C. Rather, it should be appreciated that FIG. 1 lacks any curves because it is merely a schematic representation of an actual mobile device, but the exterior perimeter 302 corresponds to an actual perimeter of an actual mobile device. Also, it should be appreciated that in each of the contour diagrams 300, 330, 350, 370, 400, 420, and 440, a region 308 generally corresponds to the slit 134 between the first cavity 106 and second cavity 108, and also a region 310 generally corresponds to the location of the wall formation 132 separating the second cavity 108 and third cavity 110.

Referring to the first, second, and third contour diagrams 300, 330, and 350 of FIGS. 3A, 3B, and 3C, in particular, these diagrams respectively show example fields that arise during first, second, and third manners of excitation of the antenna system 124, respectively, in response to signals being applied to the second feed point 118 so as to excite the second cavity 108, particularly within a region 312 that generally corresponds to (encompasses) that second cavity. Each of the fields that arise due to the manners of excitation corresponding to FIGS. 3A, 3B, and 3C are low band fields. More particularly, as shown in FIG. 3A, excitation of the second cavity 108 in the first manner results in the generation of the TM01 mode (electromagnetic field or wave pattern) within the second cavity 108. If excited in this manner, a maximum in the field levels occurs at a region 314 positioned along/within the region 308, and a minimum in the field levels occurs at a region 316 positioned along the region 310 that corresponds to the location of the wall formation 132, which serves as a hard electric short.

By comparison, as shown in FIG. 3B, excitation of the second cavity 108 in the second manner results in the generation of the TM11 mode within the second cavity 108. If excited in this manner, a maximum in the field levels occurs at a region 318 within (in the orientation shown, proximate the upper left hand corner of) the region 312, and also maxima in the field levels occur at regions 320 (in the orientation shown, along the right side of the region 312). Further, relatively low field levels are generally distributed within a region 322 distributed across nearly the entirety of the region 312, beginning near the region 308 and continuing down toward the region 310, and centered generally about a location 324. Further, with respect to FIG. 3C, excitation of the second cavity 108 in the third manner results in the generation of the TM03 mode within the second cavity 108. If excited in this manner, maxima in the field levels occur both at a middle region 326 within the region 312 and also at a region 328 positioned along/within the region 308. As for minima in the field levels, these occur both at a region 330 positioned along the region 310, as well as along a strip region 332 extending across substantially the full width of the region 312, between the middle region 326 and the region 308.

FIGS. 3A, 3B, and 3C illustrate fields that arise during three manners of excitation of the antenna system 124 in which fields are primarily excited within the second cavity 108 but not substantially excited within either of the first or third cavities 106, 110 (albeit it is possible that some modest or de minimis fields can be generated within the first and/or third cavities as well). In contrast to the contour diagrams 300, 330, and 350 of FIGS. 3A, 3B, and 3C, the fourth contour diagram 370 of FIG. 3D shows example fields that arise during a fourth manner of excitation of the antenna system 124, again due to signals applied to the second feed point 118, that result in the generation of significant fields within a region 334 that encompasses both the second cavity 108 and all or substantially all of the first cavity 106 as well.

More particularly as shown in FIG. 3D, low band fields are generated within the second cavity 108 due to the signals applied to the second feed point, and additionally high band fields are generated within the first cavity 106 due to coupling/leakage from the second cavity to the first cavity. In the example shown, the fields that are generated particularly include a maximum at a region 336 that abuts (and extends below) the region 308. Additionally, the fields that are generated include a minimum at a region 338 positioned along the region 310 corresponding to a bottom edge of the region 334, as well as a minimum 340 positioned extending across substantially the full width of the region 312 on the opposite side of the region 308, at or substantially proximate to a top edge of the region 334. Due to the relationship of the fields generated in the first cavity 106 and second cavity 108, the overall fields within the two cavities can be considered a hybrid mode. It should be apparent that the influence of the region 308 corresponding to the slit 134 varies with frequency but, in at least a number of circumstances, the region 308 (or portions of that region or portions close by that region) due to the presence of the slit 134 is a locus for one or more maxima.

As for the fifth, sixth, and seventh contour diagrams 400, 420, and 440 of FIGS. 4A, 4B, and 4C, these diagrams respectively show example fields that arise during fifth, sixth, and seventh manners of excitation of the antenna system 124, respectively, in response to signals being applied to the first feed point 116 so as to excite the first cavity 106. FIGS. 4A and 4B particularly show fields that arise within a region 402 that generally corresponds to (encompasses) the first cavity 106 and that is generally bounded, along its bottom edge (as illustrated) by the region 308 described above. In contrast, FIG. 4C particularly shows fields that arise within a region 404 that generally corresponds to (encompasses) the third cavity 110 due to passive coupling or leakage (parasitic radiation). Each of the fields that arise due to the manners of excitation corresponding to FIGS. 4A and 4B are high band fields. If the antenna system 124 is operated in the manners corresponding to FIG. 4A, the first cavity 106 can be considered to be operating as a quarter-wave cavity. By comparison, if the antenna system 124 is operated in the manner corresponding to FIG. 4C, the third cavity 110 can be considered to operating as a half-wavelength cavity.

More particularly, as shown in FIG. 4A, excitation of the first cavity 106 in the fifth manner results in the generation of the TM01 mode within the first cavity. If excited in this manner, a maximum in the field levels occurs at a region 406 positioned at or proximate to a bottom end (as illustrated) of the region 402, which is at or proximate to the region 308.

Additionally, a minimum in the field levels occurs at a region 408 that is positioned at or proximate to an upper end (as illustrated) of the region 402. By comparison, as shown in FIG. 4B, excitation of the first cavity 106 in the sixth manner results in the generation of the TM11 mode within the first cavity. If excited in this manner, maxima in the field levels occur at regions 410 positioned at or proximate to the bottom end (as illustrated) of the region 402, which is at or proximate to the region 308, particularly at the left and right (as illustrated) sides of the region 402. Additionally, minima in the field levels occur generally within a T-shaped region 412 that generally encompasses an upper region 414 that generally corresponds to the region 408 of FIG. 4A and that further encompasses an extension region 416 that proceeds generally downward (as illustrated) from the region 414 through the middle of the region 402 toward the region 308.

As for FIG. 4C, the seventh contour diagram 440 shown therein particularly illustrates fields that arise due to passive coupling or leakage of radiation (or parasitic radiation) from one or both of the first and second cavities 106 and 108 to the region 404 corresponding to the third cavity 110. In this example, the TM01 mode is again generated in cavity 110. Further, a maximum of the fields occurs at or proximate to a center region 418 within the region 404. Additionally a first minimum of the fields occurs at or along a region 420 positioned along the region 310 that corresponds to the location of the wall formation 132, and a second minimum of the fields occurs at or along a region 422 positioned at the end of the region 404 opposite the region 420, which corresponds to (in the present illustration) the bottom end of the region 404 and of the mobile device 100.

Figure 5:
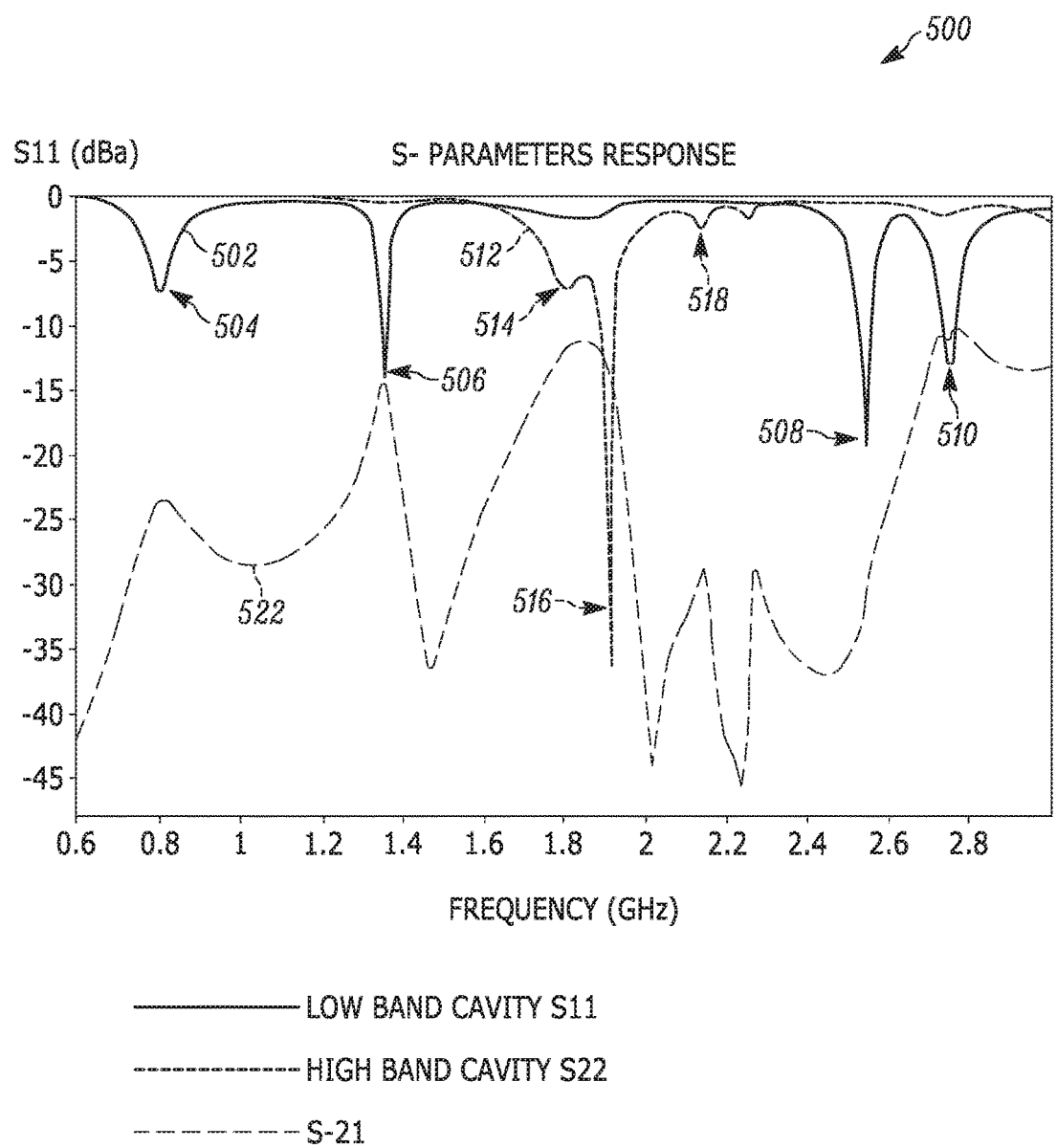
FIG. 5 is a S parameter diagram showing example S parameter responses (as a function of frequency) corresponding to the field patterns shown in FIGS. 3A-3D and 4A-4C.

Turning to FIG. 5, an S parameter diagram 500 is provided to show example S parameter responses (as a function of frequency) corresponding to the field patterns shown in FIGS. 3A-3D and 4A-4C. An upper (solid line) curve 502 particularly shows the S-parameter (scattering parameters) response of the antenna system 124 for operation in which it is cavity 108 that is excited. As can be seen, the S-parameter response—and particularly the return loss or S11—of the antenna system 124 particularly dips at first, second, third, and fourth frequencies 504, 506, 508, and 510, respectively, which are approximately 800 MHz, 1.36 GHz, 2.57 GHz and 2.75 GHz, respectively. Thus, transmission and reception strength from the mobile device 100 is particularly strong at the first, second, third, and fourth frequencies 504, 506, 508, and 510, respectively, in response to the antenna system 124 being excited in accordance with the manners of FIGS. 3A, 3B, 3C, and 3D, respectively. Accordingly, operation in the manners of FIGS. 3A, 3B, 3C, and 3D, respectively, particularly involves the application of signals at the second feed point 118 that are at or proximate to the first, second, third, and fourth frequencies 504, 506, 508, and 510, respectively.

Further, a lower (dashed line) curve 512 particularly shows the S-parameter (scattering parameters) response of the antenna system 124 for operation in which it is the first (high band) cavity 106 that is excited. As can be seen, the S-parameter response—and particularly the return loss or S22—of the antenna system 124 particularly dips at fifth, sixth, and seventh frequencies 514, 516, and 518, respectively, which are approximately 1.36 GHz, 1.92 GHz and 2.15 GHz, respectively. Thus, transmission and reception strength from the mobile device 100 is particularly strong at the fifth, sixth, and seventh frequencies 514, 516, and 518 in response to the antenna system 124 being excited in accordance with the manners of FIGS. 4A, 4B, and 4C, respectively, and accordingly operation in the manners of FIGS.

4A, 4B, and 4C, respectively, particularly involves the application of signals at the first feed point 116 that are at or proximate to the first, second, and third frequencies, respectively. Additionally, it should be further appreciated that FIG. 5 also includes a further curve 520 that shows the S-parameter response—in this case the transmission response S21 (coupling between ports)—for the antenna system 124 as well.

It should be understood that the above-described features and operational characteristics of the mobile device 100 and particularly the antenna system 124 are merely exemplary, and the above description does not show all of the operational characteristics of the mobile device 100 with the antenna system 124. In this regard, Table 1 is provided to show additional data regarding an eigenmode solution for an antenna system such as the antenna system 124. Table 1 particularly shows a mathematically calculated list of the first twenty resonant modes that the antenna system 124 of the mobile device 100 supports, and the associated center frequencies and Q values for those modes. Based on this information, an operator or mobile device designer can determine desired modes of operation for the mobile device, as well as corresponding frequencies of operation for those modes that achieve good radiating properties.

TABLE 1

Listing of Modes and Corresponding Center Frequencies and Q

| Eigenmode | Frequency [GHz] | | Q |
|---|---|---|---|
| Mode 1 | 0.890925 + i | 0.0007629 ... | 583.849 |
| Mode 2 | 1.45124 + i | 0.000769363 | 943.145 |
| Mode 3 | 1.69863 + i | 0.000682836 | 1243.81 |
| Mode 4 | 1.86033 + i | 0.000406014 | 2290.97 |
| Mode 5 | 1.99250 + i | 0.000343977 | 2896.27 |
| Mode 6 | 2.05225 + i | 0.000587482 | 1746.65 |
| Mode 7 | 2.11492 + i | 0.00124085 | 852.208 |
| Mode 8 | 2.21383 + i | 0.000312358 | 3543.73 |
| Mode 9 | 2.26366 + i | 0.000973191 | 1163.01 |
| Mode 10 | 2.43760 + i | 0.000184301 | 6613.11 |
| Mode 11 | 2.45731 + i | 0.000250353 | 4907.68 |
| Mode 12 | 2.50907 + i | 0.000163547 | 7670.79 |
| Mode 13 | 2.66450 + i | 9.47012e-0 ... | 14067.9 |
| Mode 14 | 2.68022 + i | 2.76788e-0 ... | 48416.4 |
| Model 15 | 2.71763 + i | 0.000835095 | 1627.14 |
| Model 16 | 2.72838 + i | 9.27077e-0 ... | 14714.9 |
| Model 17 | 2.77697 + i | 0.000299993 | 4628.39 |
| Model 18 | 2.79260 + i | 0.000914810 | 1526.33 |
| Model 19 | 2.84922 + i | 0.000270226 | 5271.93 |
| Model 20 | 2.85570 + i | 0.000932603 | 1531.03 |

Figure 6:
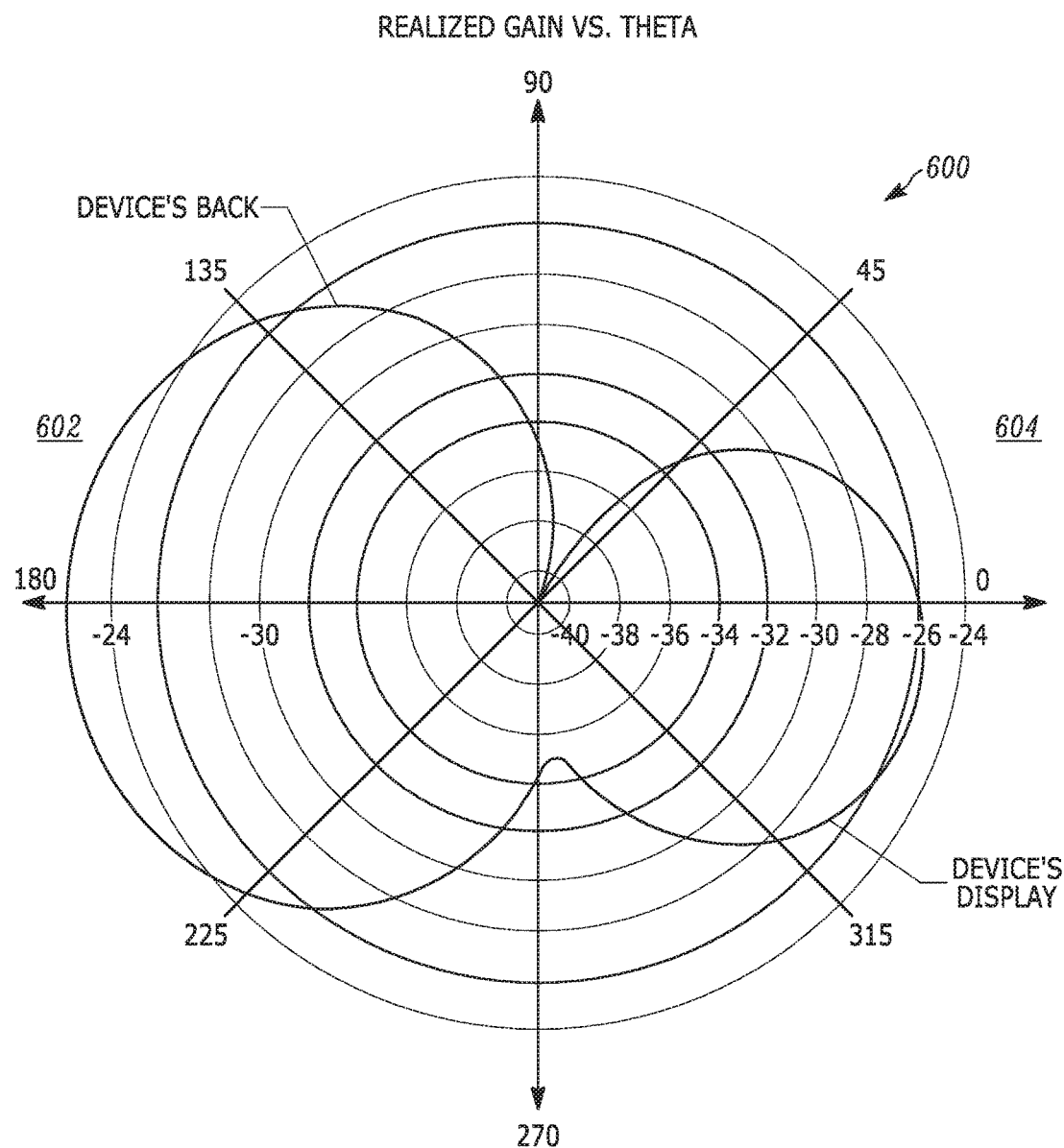
FIG. 6 is a radiation plot illustrating example radiation levels occurring around the mobile device of FIG. 1 during operation of the antenna system of that mobile device.

In addition to the above description concerning the fields that arise in the antenna system 124 of the mobile device 100 during various manners of operation, and concerning how the response of that antenna system varies based upon frequency, a further operational aspect of that antenna system is the radiation pattern of radiation emitted by the mobile device. The antenna system 124 and particularly the cavities 106, 108, and 110 thereof are arranged along the back surface 112 on the opposite side of the mobile device 100 relative to the display 122. Given this arrangement, and also because of the structural characteristics of the cavities 106, 108, and 110 themselves, radiation substantially is emitted from the mobile device in directions extending outward out of the mobile device 100 from the back surface 112 rather than outward out of the mobile device 100 from the display. FIG. 6 particularly shows an example radiation pattern 600 illustrating how most of the radiation is tilted toward the back of the mobile device 100, in directions 602 outward from the back surface 112, rather than toward the front (display side) of the mobile device in directions 604 outward from the display 122.

Correspondingly it can be said of the mobile device 100 that the antenna system 124 of the mobile device is arranged such that a majority of electromagnetic radiation emitted outward from the mobile device occurs by way of paths that do not pass through the display 122.

In view of the above description, it should be appreciated that mobile devices such as the mobile device 100 can be beneficial in one or more respects by comparison with one or more conventional mobile devices. At least some mobile devices having antenna systems such as those described above are beneficial in that the antenna systems are suitable for communications at multiple frequencies or cellular bands. Indeed, in at least some such embodiments, each cavity antenna of a given such antenna system can communicate at multiple frequencies or cellular bands. Also, at least some mobile devices having antenna systems such as those described above are beneficial because the antenna system can fit the shape of the mobile device (or phone), and can allow for a metal-backed cellular product.

Additionally for example, at least some such mobile devices can be beneficial in terms of achieving a significant reduction in head-related degradation, due to the antenna system 124 being an away-from-head design in terms of how radiation is directed outward from the mobile device. Also for example, at least some such mobile devices can be beneficial in terms of achieving a significant increase of the active area on the front of the device due to the relocation of the main antenna keepout from the bottom of the phone to the back of the phone. Also, with respect to a mobile device such as the mobile device 100 that employs the antenna system 124 along its back surface, a mobile device designer has the ability to make the exterior finish of the device either metal or plastic/wood/leather/etc. without changing the antenna design.

Therefore, in view of the above description, it should be recognized that at least some embodiments encompassed by the present disclosure relate to a mobile device (or phone) that includes a chassis that is partially or totally composed of resonant antenna cavities. The cavities of the mobile device can be re-used for several bands by multi-mode excitation. Further, given the placement of the cavities side-by-side one another, in at least some circumstances operation of the mobile device can involve excitation of coupled modes in adjacent cavities. Further, also in at least some cases there is control of coupled modes between cavities via partially open channels along the edges of the device, connecting some or all of the cavities.

Additionally, at least some embodiments encompassed by the present disclosure relate to a wireless mobile device that uses coupled resonant cavities as the main venue for electromagnetic transmission (or radiation) and reception. Further, at least some embodiments encompassed by the present disclosure relate to an antenna system based on coupled resonant cavities impervious to the presence of metal on three of the sides of the parallelepiped that would encompass its volume (as noted above, the present disclosure is also intended to encompass other embodiments with cavities that have shapes other than a parallelepiped—including, for example, cavities having curved shapes or other shapes are also encompassed herein). Additionally, at least some embodiments encompassed by the present disclosure relate to an antenna system based on coupled resonant cavities that can be used as the metal exoskeleton of a wireless device (e.g., a metal cover for a handset) or that can be covered by other materials for decoration (e.g., leather, wood or other materials).

At least some embodiments encompassed by the present disclosure relate to an antenna system for a portable device comprising one or more cavities on the back side of the device (e.g., with a rectangular prism shape in at least some such embodiments), where each cavity has at least one edge that is open (that is, open-circuited, and not shorted to ground). In at least some such embodiments, there is at least one cavity excited via a probe feed located between the ground and roof of the cavity, largely internal to the cavity and supporting one or more frequency bands of operation by directly or parasitically exciting resonant mode(s) in the one or more cavities, corresponding to the desired frequency bands of operation.

Further, at least some embodiments encompassed by the present disclosure involve exciting with a single probe feed to one cavity a directly-fed mode in the fed cavity at one frequency and a coupled-fed mode in another cavity at another frequency. Additionally, at least some embodiments encompassed by the present disclosure involve exciting hybrid modes with field patterns spanning more than one cavity, with a single feed on one cavity. Further, at least some embodiments encompassed by the present disclosure involve exciting a mode with a probe feed in one cavity located at a field maximum for the desired mode, but at a field minimum for another mode in the cavity which is desired to be isolated from said feed probe. In particular, the additional mode may be coupled to another feed in another cavity, where it is desired to maintain isolation between the two feeds.

Notwithstanding the above description of one or more embodiments, it should also be appreciated that the present disclosure encompasses numerous other embodiments and variations of embodiments in addition to those described above. For example, although the above description particularly relates to antenna systems provided on mobile devices such as smart phones or cellular telephones, the present disclosure is also intended to encompass antenna systems implemented in other types of mobile devices or electronic devices including, for example, personal digital assistants (PDAs), other handheld or portable electronic devices, headsets, desktop monitors, televisions, MP3 players, battery-powered devices, wearable devices (e.g., wristwatches), radios, navigation devices, tablet computers, laptop or notebook computers, pagers, PMPs (personal media players), DVRs (digital video recorders), gaming devices, PC mouse pads, and other electronic devices. Further, the present disclosure is also intended to encompass antenna systems implemented on other devices or in other environments other than mobile devices or electronic devices including, additionally for example, automotive systems. Also such antenna systems, and all devices and systems employing all such antenna systems, are encompassed herein.

Further, the present disclosure is intended to encompass numerous other embodiments of antenna systems and components thereof in addition to the antenna system 124 and components thereof described above. For example, although the antenna system 124 includes a one-feed-point per cavity model insofar as the first feed point 116 is within the first cavity 106, the second feed point 118 is within the second cavity 108, and the third feed point 120 is within the third cavity 110, in other embodiments there need not be a feed point in every cavity (e.g., one or more cavities can be solely excited due to coupling of energy from another cavity or cavities) or, alternatively, more than one feed point can be present within a given cavity. Indeed, in some embodiments in which it is envisioned that multiple modes are to be generated in a given cavity, it is appropriate to provide multiple respective feed points within that cavity at different locations, respectively, at or near where the different maxima for the different modes are expected to occur, respectively.

Also, in other embodiments, the antenna system can include a number of cavities that is other than three including, for example, four cavities, two cavities, or one cavity. Further, although the cavities 106, 108, and 110 described above are all rectangular prism cavities, the present disclosure also is intended to encompass antenna systems employing one or more cavities that have different shapes including, for example, cylindrical cavities (as well as non-canonical shapes or shapes that are perturbations of canonical shapes). Additionally, the present disclosure is intended to encompass a variety of methods of operation, implementation, and manufacturing of antenna systems, mobile or other electronic devices, or other systems, as described above. All such additional or modified embodiments, and others, are intended to be encompassed herein.

Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A mobile device comprising:
 a display provided along a front surface of the mobile device;
 a chassis having first and second cavities provided along a rear surface of the mobile device, the rear surface being substantially opposite the front surface, the first and second cavities linked by partially open channels extending along edges of the mobile device allowing for coupling of energy between the first and second cavities; and
 one or more electrical components supported in between the display and the chassis, the one or more electrical components operative to provide excitation signals to one or both of the first and second cavities such that electrical fields in accordance with a plurality of modes occur respectively within the cavities at multiple frequencies, respectively.

2. The mobile device of claim 1, wherein the excitation signals include first and second excitation signals that are both provided to the first cavity, and wherein the plurality of modes includes a first mode and a second mode that both occur within the first cavity in response to the first excitation signal and the second excitation signal, respectively.

3. The mobile device of claim 1, wherein the plurality of modes includes a first mode and a second mode, wherein the excitation signals include first and second excitation signals, and wherein the one or more electrical components provide the first excitation signal to the first cavity so as to generate the first mode in the first cavity and provide the second excitation signal to the second cavity so as to generate the second mode in the second cavity.

4. The mobile device of claim 1, wherein the plurality of modes includes a first mode and a second mode, wherein the excitation signals include first and second excitation signals, and wherein the one or more electrical components provide the first excitation signal to the first cavity so as to generate the first mode in the first cavity and to provide the second excitation signal to the first cavity so as to generate the second mode in the second cavity, the second mode arising due to coupling of energy between the first and second cavities, the first cavity being adjacent or proximate to the second cavity.

5. The mobile device of claim 1, further comprising one or more feed points arranged within the first and second cavities.

6. The mobile device of claim 5, wherein a first of the feed points is arranged within the first cavity and a second of the feed points is arranged within the second cavity.

7. The mobile device of claim 5, wherein both of a first and a second of the feed points are arranged within the first cavity.

8. A mobile device comprising:
a display provided along a front surface of the mobile device;
a chassis having first, second and third cavities provided along a rear surface of the mobile device, the rear surface being substantially opposite the front surface, each of the cavities being a rectangular prism, with the first cavity comprising a first end that is grounded such that the first cavity is operative to provide a plurality of modes;
one or more probe feed points arranged within the first and second cavities with a first and a second of the probe feed points arranged within the first cavity and located between a respective ground plane portion and a respective roof portion of the first cavity; and
one or more electrical components supported in between the display and the chassis, the one or more electrical components operative to provide excitation signals to one or all of the first, second and third cavities via respective probe feed points such that electrical fields in accordance with a plurality of modes occur respectively within the cavities at multiple frequencies, respectively.

9. The mobile device of claim 5, wherein each of the feed points is positioned proximate a respective location within the first and second cavities at or near which one or more maxima of the plurality of modes will occur or are likely to occur.

10. The mobile device of claim 1, wherein the mobile device is a cellular telephone or a smart phone and the chassis is partially or totally formed by the cavities, which are resonant antenna cavities.

11. The mobile device of claim 1, wherein an antenna system of the mobile device includes the cavities, and wherein a majority of electromagnetic radiation emitted by the antenna system of the mobile device is emitted outward from the mobile device by way of paths that do not pass through the display.

12. The mobile device of claim 11, wherein the mobile device is a wireless communications device, wherein either metallic portions of the antenna system forming the cavities can be used as a metal exoskeleton of the mobile device or the metallic portions can be covered with other decorative non-metallic materials.

13. An antenna system comprising:
a first cavity including first, second, and third metallic wall portions, wherein the first and second metallic wall portions are substantially parallel with one another and separated by a first dielectric portion, and wherein first and second edges of the first and second metallic wall portions are coupled together by way of the third metallic wall portion;
a second cavity including fourth, fifth, and sixth metallic wall portions, wherein the fourth and fifth metallic wall portions are substantially parallel with one another and separated by a second dielectric portion, and wherein third and fourth edges of the fourth and fifth metallic wall portions are coupled together by way of the sixth metallic wall portion, wherein the second metallic wall portion is integrally formed or coupled with the fifth metallic wall portion and the second and fifth metallic wall portions form a ground plane, and wherein the first and fourth metallic wall portions are spaced apart from one another by way of a slit region that completely separates parallel facing edges of the first metallic wall portion and fourth metallic wall portion; and
a first feed structure positioned within the first cavity, wherein in response to one or more excitation signals applied to the first feed structure, a first mode at a first frequency is generated within the first cavity and a second mode is generated either within the first cavity or the second cavity either at the first frequency or at a second frequency and, in response to the generation of the first and second modes, electromagnetic radiation is emitted from one or both of the first and second cavities.

14. The antenna system of claim 13, wherein the second mode is generated within the second cavity due to the first and second cavities being coupled resonant cavities.

15. An antenna system comprising:
a first cavity including first, second, and third metallic wall portions, wherein the first and second metallic wall portions are substantially parallel with one another and separated by a first dielectric portion, and wherein first and second edges of the first and second metallic wall portions are coupled together by way of the third metallic wall portion;
a second cavity including fourth, fifth, and sixth metallic wall portions, wherein the fourth and fifth metallic wall portions are substantially parallel with one another and separated by a second dielectric portion, and wherein third and fourth edges of the fourth and fifth metallic wall portions are coupled together by way of the sixth metallic wall portion, wherein the second metallic wall portion is integrally formed or coupled with the fifth metallic wall portion and the second and fifth metallic wall portions form a ground plane, the first and fourth metallic wall portions spaced apart from one another by way of a slit region where at least one non-metallic side channel couples the first and second cavities;
a third cavity that shares the sixth metallic wall portion with the second cavity;
a first feed structure positioned within the first cavity; and
a controller operative to apply one or more excitation signals to the first feed structure, wherein in response to the one or more excitation signals a first mode at a first frequency is generated within the first cavity and a second mode is generated either within the first cavity or the second cavity either at the first frequency or at a second frequency and, in response to the generation of the first and second modes, electromagnetic radiation is emitted from one or both of the first and second cavities, where the second mode is generated within the second cavity due to the first and second cavities being coupled resonant cavities.

16. A mobile device comprising the antenna system of claim 13, wherein a display of the mobile device is along a front surface of the mobile device and the cavities are along a rear surface of the mobile device that is substantially opposite to the front surface.

17. An automotive system comprising the antenna system of claim 13.

* * * * *